United States Patent
Cobb et al.

(10) Patent No.: US 8,635,159 B1
(45) Date of Patent: Jan. 21, 2014

(54) SELF-SERVICE TERMINAL LIMITED ACCESS PERSONAL IDENTIFICATION NUMBER ("PIN")

(75) Inventors: Matthew I. Cobb, Charlotte, NC (US); Timothy B. Vannatter, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 319 days.

(21) Appl. No.: 12/732,242

(22) Filed: Mar. 26, 2010

(51) Int. Cl.
*G06Q 40/00* (2012.01)

(52) U.S. Cl.
USPC ............... 705/43; 705/44; 235/379; 235/380

(58) Field of Classification Search
USPC ................ 705/43, 44; 235/379, 380
See application file for complete search history.

(56) References Cited

U.S. PATENT DOCUMENTS

| | | | |
|---|---|---|---|
| 5,354,974 A * | 10/1994 | Eisenberg | 235/379 |
| 5,731,575 A * | 3/1998 | Zingher et al. | 235/379 |
| 6,000,832 A * | 12/1999 | Franklin et al. | 700/232 |
| 6,052,675 A * | 4/2000 | Checchio | 705/44 |
| 6,095,416 A * | 8/2000 | Grant et al. | 235/449 |
| 6,163,771 A * | 12/2000 | Walker et al. | 705/18 |
| 6,257,486 B1 * | 7/2001 | Teicher et al. | 235/380 |
| 6,339,766 B1 * | 1/2002 | Gephart | 705/44 |
| 6,437,692 B1 | 8/2002 | Petite et al. | |
| 6,636,833 B1 * | 10/2003 | Flitcroft et al. | 705/64 |
| 6,679,422 B2 * | 1/2004 | Brown et al. | 235/379 |
| 6,775,398 B1 * | 8/2004 | Schaeck et al. | 382/124 |
| 6,796,497 B2 * | 9/2004 | Benkert et al. | 235/380 |
| 6,871,288 B2 * | 3/2005 | Russikoff | 726/19 |
| 6,948,077 B1 * | 9/2005 | Pitale | 726/9 |
| 6,976,622 B1 | 12/2005 | Trelawney et al. | |
| 7,004,385 B1 * | 2/2006 | Douglass | 235/379 |
| 7,053,767 B2 | 5/2006 | Petite et al. | |
| 7,090,122 B1 * | 8/2006 | Warren et al. | 235/379 |
| 7,100,821 B2 * | 9/2006 | Rasti | 235/380 |

(Continued)

FOREIGN PATENT DOCUMENTS

| | | |
|---|---|---|
| EP | 961246 | 10/2008 |
| WO | WO 01/351900 | 5/2001 |
| WO | WO 2004/044800 | 5/2004 |

OTHER PUBLICATIONS http://www.ncr.com/documents/aptra_advance_ndc_uk_ds.pdf retrieved on Feb. 1, 2010.

(Continued)

*Primary Examiner* — Sara C Hamilton
(74) *Attorney, Agent, or Firm* — Weiss & Arons LLP; Michael Springs

(57) ABSTRACT

A method for operating an electronic self-service device is provided. The method may include using an electronic receiver module to receive electronic data from the self-service device. The electronic data may include information regarding a limited access personal identification number ("PIN"). The method may further include using an electronic computational module to test the PIN using a plurality of algorithms. The testing preferably determines whether the PIN corresponds to one of a plurality of stored PIN offset values. The method may also include identifying an algorithm that obtains a correspondence between the PIN and one of the plurality of stored PIN offset values. The method may further include using an electronic transmitter to transmit a signal corresponding to the algorithm used to obtain the correspondence and receiving an electronic authorization message that comprises instructions. The instructions may provide limited access authorization information.

11 Claims, 9 Drawing Sheets

(56) References Cited

U.S. PATENT DOCUMENTS

| | | | |
|---|---|---|---|
| 7,136,835 B1* | 11/2006 | Flitcroft et al. | 705/39 |
| 7,140,539 B1* | 11/2006 | Crews et al. | 235/379 |
| 7,163,144 B1 | 1/2007 | Trelawney et al. | |
| 7,175,073 B2* | 2/2007 | Kelley et al. | 235/379 |
| 7,177,835 B1* | 2/2007 | Walker et al. | 705/39 |
| 7,210,622 B2* | 5/2007 | Lambert et al. | 235/382.5 |
| 7,216,801 B1* | 5/2007 | Crews et al. | 235/379 |
| 7,219,833 B2* | 5/2007 | Cantini et al. | 235/379 |
| 7,249,092 B2* | 7/2007 | Dunn et al. | 705/38 |
| 7,284,692 B1* | 10/2007 | Douglass | 235/379 |
| 7,284,695 B1* | 10/2007 | Warren et al. | 235/379 |
| 7,287,009 B1* | 10/2007 | Liebermann | 705/42 |
| 7,295,993 B1 | 11/2007 | Meek et al. | |
| 7,314,163 B1* | 1/2008 | Crews et al. | 235/379 |
| 7,314,166 B2* | 1/2008 | Anderson et al. | 235/380 |
| 7,328,839 B2* | 2/2008 | Keohane et al. | 235/379 |
| 7,331,515 B2* | 2/2008 | Blackson et al. | 235/379 |
| 7,337,144 B1* | 2/2008 | Blinn et al. | 705/40 |
| 7,377,425 B1* | 5/2008 | Ma et al. | 235/379 |
| 7,395,242 B2* | 7/2008 | Blinn et al. | 705/39 |
| 7,398,250 B2* | 7/2008 | Blinn et al. | 705/41 |
| 7,419,093 B1* | 9/2008 | Blackson et al. | 235/379 |
| 7,428,984 B1* | 9/2008 | Crews et al. | 235/379 |
| 7,438,219 B1* | 10/2008 | Crews et al. | 235/379 |
| 7,441,697 B2* | 10/2008 | Fletcher | 235/380 |
| 7,441,706 B1* | 10/2008 | Schuessler et al. | 235/462.15 |
| 7,448,538 B2* | 11/2008 | Fletcher | 235/380 |
| 7,467,744 B1* | 12/2008 | Crews et al. | 235/379 |
| 7,469,824 B1* | 12/2008 | Crews et al. | 235/379 |
| 7,472,827 B2* | 1/2009 | Fletcher | 235/380 |
| 7,472,829 B2* | 1/2009 | Brown | 235/382.5 |
| 7,497,371 B1* | 3/2009 | Sparks | 235/379 |
| 7,516,886 B2* | 4/2009 | Gangi | 235/380 |
| 7,567,934 B2* | 7/2009 | Flitcroft et al. | 705/37 |
| 7,568,631 B2* | 8/2009 | Gibbs et al. | 235/494 |
| 7,571,142 B1* | 8/2009 | Flitcroft et al. | 705/44 |
| 7,577,614 B1* | 8/2009 | Warren et al. | 705/43 |
| 7,584,885 B1* | 9/2009 | Douglass | 235/379 |
| 7,611,048 B1* | 11/2009 | Warren et al. | 235/379 |
| 7,630,927 B2* | 12/2009 | Canard et al. | 705/35 |
| 7,636,694 B1* | 12/2009 | Wankmueller et al. | 705/64 |
| 7,690,561 B1* | 4/2010 | Blackson et al. | 235/379 |
| 7,698,221 B2* | 4/2010 | Blinn et al. | 705/41 |
| 7,707,108 B2* | 4/2010 | Brown et al. | 705/40 |
| 7,712,657 B1* | 5/2010 | Block et al. | 235/379 |
| 7,735,721 B1* | 6/2010 | Ma et al. | 235/379 |
| 7,739,194 B2* | 6/2010 | Blinn et al. | 705/41 |
| 7,780,074 B1* | 8/2010 | Crews et al. | 235/379 |
| 7,780,077 B1* | 8/2010 | Warren et al. | 235/379 |
| 7,819,309 B1* | 10/2010 | Warren et al. | 235/379 |
| 7,822,666 B1* | 10/2010 | Bursch | 705/35 |
| 7,835,960 B2* | 11/2010 | Breck et al. | 705/35 |
| 7,840,485 B1* | 11/2010 | Warren et al. | 705/43 |
| 7,844,550 B2* | 11/2010 | Walker et al. | 705/74 |
| 7,853,529 B1* | 12/2010 | Walker et al. | 705/55 |
| 7,899,742 B2* | 3/2011 | Benkert et al. | 705/39 |
| 7,954,704 B1* | 6/2011 | Gephart et al. | 235/380 |
| 7,980,464 B1* | 7/2011 | Sarris et al. | 235/379 |
| 7,996,288 B1* | 8/2011 | Stolfo | 705/35 |
| 8,019,658 B2* | 9/2011 | Sines et al. | 705/26.8 |
| 8,047,429 B1* | 11/2011 | Warren et al. | 235/379 |
| 8,052,045 B1* | 11/2011 | Warren et al. | 235/379 |
| 8,127,982 B1* | 3/2012 | Casey et al. | 235/379 |
| 8,145,522 B2* | 3/2012 | Warren et al. | 705/14.17 |
| 8,152,059 B2* | 4/2012 | Sparks | 235/382 |
| 8,157,163 B1* | 4/2012 | Crews et al. | 235/379 |
| 8,170,954 B2* | 5/2012 | Keresman et al. | 705/44 |
| 2001/0034720 A1* | 10/2001 | Armes | 705/65 |
| 2001/0047330 A1* | 11/2001 | Gephart et al. | 705/39 |
| 2002/0038818 A1* | 4/2002 | Zingher et al. | 235/381 |
| 2002/0099635 A1* | 7/2002 | Guiragosian | 705/35 |
| 2002/0125998 A1 | 9/2002 | Petite et al. | |
| 2002/0169720 A1* | 11/2002 | Wilson et al. | 705/44 |
| 2002/0170954 A1* | 11/2002 | Zingher et al. | 235/375 |
| 2003/0028481 A1* | 2/2003 | Flitcroft et al. | 705/39 |
| 2003/0066876 A1* | 4/2003 | Goldman et al. | 235/379 |
| 2003/0144952 A1* | 7/2003 | Brown et al. | 705/40 |
| 2003/0197058 A1* | 10/2003 | Benkert et al. | 235/380 |
| 2004/0015450 A1* | 1/2004 | Zingher et al. | 705/64 |
| 2004/0078325 A1* | 4/2004 | O'Connor | 705/39 |
| 2004/0143527 A1* | 7/2004 | Benkert et al. | 705/35 |
| 2004/0168067 A1* | 8/2004 | Russikoff | 713/183 |
| 2004/0178263 A1* | 9/2004 | Jones et al. | 235/381 |
| 2004/0249753 A1* | 12/2004 | Blinn et al. | 705/41 |
| 2004/0260647 A1* | 12/2004 | Blinn et al. | 705/41 |
| 2005/0065885 A1* | 3/2005 | Gordon | 705/43 |
| 2005/0080730 A1* | 4/2005 | Sorrentino | 705/39 |
| 2005/0252961 A1* | 11/2005 | Rasti | 235/380 |
| 2006/0076400 A1* | 4/2006 | Fletcher | 235/379 |
| 2006/0122931 A1* | 6/2006 | Walker et al. | 705/39 |
| 2006/0157553 A1* | 7/2006 | Kelley et al. | 235/380 |
| 2006/0163343 A1* | 7/2006 | Changryeol | 235/380 |
| 2006/0181406 A1 | 8/2006 | Petite et al. | |
| 2006/0213979 A1* | 9/2006 | Geller et al. | 235/380 |
| 2006/0278697 A1* | 12/2006 | Lovett | 235/380 |
| 2007/0078760 A1* | 4/2007 | Conaty et al. | 705/39 |
| 2007/0081540 A1* | 4/2007 | Crowell et al. | 370/395.1 |
| 2007/0083466 A1* | 4/2007 | Crowell et al. | 705/43 |
| 2007/0114274 A1* | 5/2007 | Gibbs et al. | 235/380 |
| 2007/0136197 A1* | 6/2007 | Morris | 705/44 |
| 2007/0203835 A1* | 8/2007 | Cai | 705/43 |
| 2007/0228161 A1* | 10/2007 | Fletcher | 235/380 |
| 2007/0284434 A1* | 12/2007 | Fletcher | 235/379 |
| 2008/0010220 A1* | 1/2008 | Hobson et al. | 705/76 |
| 2008/0033879 A1* | 2/2008 | Blinn et al. | 705/44 |
| 2008/0052227 A1* | 2/2008 | Canard et al. | 705/39 |
| 2008/0075235 A1* | 3/2008 | Russikoff | 379/45 |
| 2008/0120238 A1* | 5/2008 | Flitcroft et al. | 705/44 |
| 2008/0121692 A1 | 5/2008 | MacPhail et al. | |
| 2008/0235135 A1* | 9/2008 | Blinn et al. | 705/41 |
| 2008/0283594 A1* | 11/2008 | Unbehagen | 235/380 |
| 2008/0301047 A1* | 12/2008 | Fish et al. | 705/41 |
| 2009/0037333 A1* | 2/2009 | Flitcroft et al. | 705/44 |
| 2009/0055269 A1* | 2/2009 | Baron | 705/14 |
| 2009/0114716 A1* | 5/2009 | Ramachandran | 235/379 |
| 2009/0132417 A1* | 5/2009 | Scipioni et al. | 705/44 |
| 2009/0164373 A1* | 6/2009 | Blythe | 705/44 |
| 2009/0222367 A1* | 9/2009 | Jenkins et al. | 705/35 |
| 2009/0276347 A1* | 11/2009 | Kargman | 705/35 |
| 2009/0289105 A1* | 11/2009 | Block et al. | 235/379 |
| 2010/0063906 A1* | 3/2010 | Nelsen et al. | 705/30 |
| 2010/0076833 A1* | 3/2010 | Nelsen | 705/14.25 |
| 2010/0082487 A1* | 4/2010 | Nelsen | 705/44 |
| 2010/0268645 A1* | 10/2010 | Martino et al. | 705/44 |
| 2010/0312709 A1* | 12/2010 | Maddocks | 705/72 |
| 2011/0102141 A1* | 5/2011 | Wu | 340/5.82 |
| 2011/0153437 A1* | 6/2011 | Archer et al. | 705/17 |

OTHER PUBLICATIONS http://www.gasper-corp.com/Solution_Exchange.asp retrieved on Feb. 1, 2010.

http://www.aciworldwide.com/igsbase/igstemplate.cfm/SRC=MD-021/SRCN=lookupdetails/GnavID=103/SnavID=/TnavID=/LookupCatID=30/CATsearch=1 Retrieved on Feb. 1, 2010.

\* cited by examiner

SELF-SERVICE TERMINAL LIMITED ACCESS PERSONAL IDENTIFICATION NUMBER ("PIN")

FIELD OF TECHNOLOGY

Aspects of the disclosure relate to providing apparatus and methods for improving self-service devices such as Automatic Teller Machines ("ATMs"), cash recyclers, and self-service kiosks.

BACKGROUND OF THE INVENTION

Self-service devices such as Automatic Teller Machines ("ATMs"), cash recyclers, and self-service kiosks are typically operated by a user in a two-step method. First, the user inserts a banking card, transaction card or other object (referred to collectively herein as a "bank card") that contains information identifying a user account. Then, the user enters a typically four-digit Personal Identification Number ("PIN"). The self-service device then compares the identification information on the bank card or other object to the received PIN. If the PIN corresponds to a predetermined secure code associated with the identification information, such as a PIN offset value, the user is provided full access to his or her accounts.

One drawback associated with the aforementioned, substantially ubiquitous, system is that the system is susceptible to fraud. For example, if a thief watches a user enter his or her four-digit PIN, and then manages to misappropriate the user's bank card, the user's entire bank account(s) may be exposed to trespass by the thief.

It would be desirable, therefore, to provide apparatus and methods that allow a user to access his or her accounts without exposing substantial the entire scope of his or her financial accounts to trespass.

SUMMARY OF THE INVENTION

An electronic self-service device is provided. The self-service device includes a receiver module configured to receive an input. The input includes information including a personal identification number ("PIN"). The self-service device also includes a processor module configured to determine whether predetermined limited access information corresponds to the received PIN. The self-service device includes a transmitter module. When the limited access information corresponds to the received PIN, the transmitter module is configured to communicate the limited access information to a central server. The receiver is configured to receive limited access instructions from the central server. The limited access instructions provide access to a predetermined portion of a user's accounts. The predetermined portion is less than the entirety of the user's accounts.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
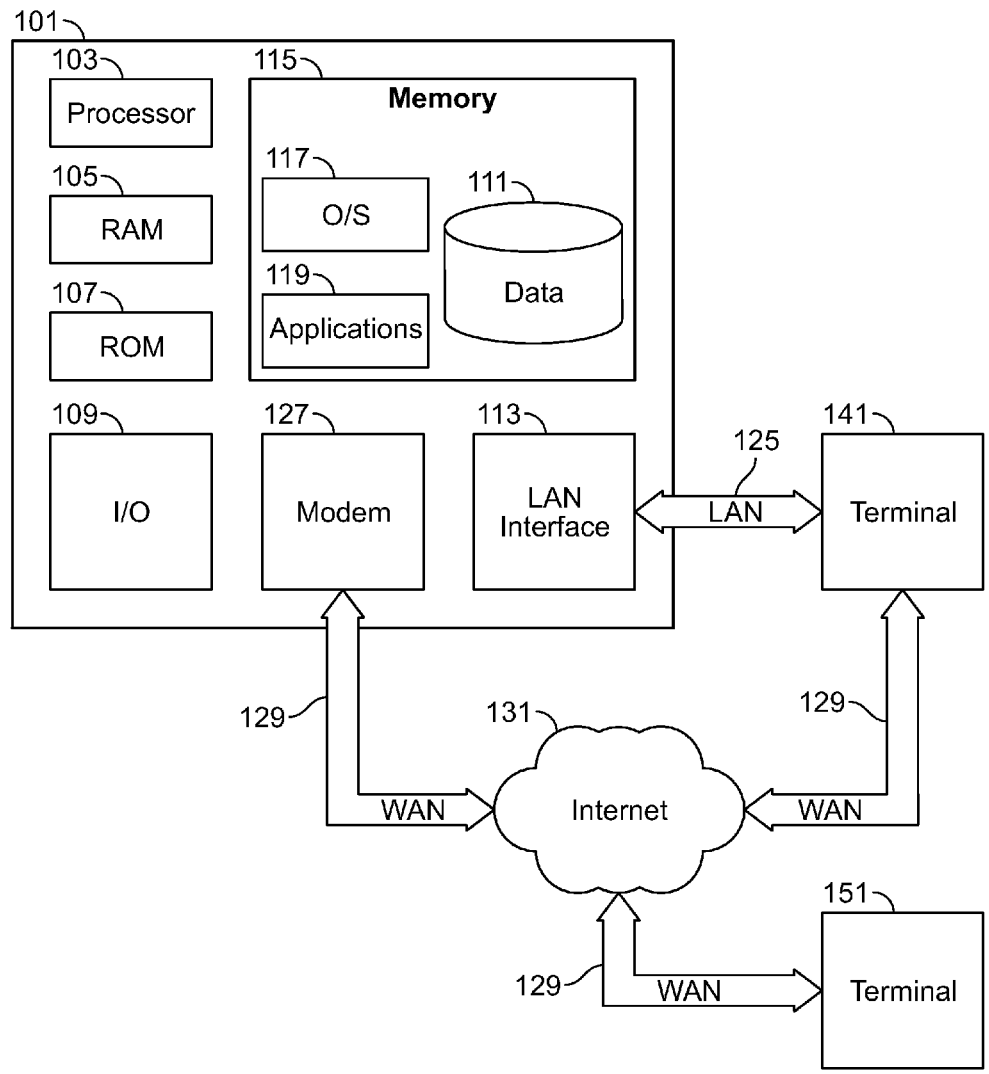
FIG. 1 shows apparatus that may be used in accordance with the principles of the invention.

Apparatus and methods for improving fraud protection in self-service devices such as Automatic Teller Machines ("ATMs"), cash recyclers, and self-service kiosks are provided. Fraud protection according to the invention may include reducing user account exposure to fraud, conversion, theft or any other misappropriation.

An ATM for use with apparatus and methods according to the invention may be made up of one or more of the following devices or other suitable devices: a CPU (which may control user interface mechanisms, transaction devices, and communication with a central server), a magnetic card reader (to identify the card being used), a PIN pad, a cryptoprocessor, a display, function keys (usually in close proximity to the display) and/or a touchscreen, a printer (to provide a transaction record to a customer), a vault (to store portions of the machinery requiring restricted access), and a housing. In certain ATMs, a smart card reader (that reads a chip instead of a magnetic strip) and bill validation technology may also be implemented. A further feature of an ATM for use with systems and methods according to the invention may include printing each transaction to a roll paper journal that is stored inside the ATM.

The apparatus and methods may be scalable, for example, to cover all or a portion of the fleet of ATMs that run on a platform such as that available under the trademark APTRA platform, which is available from the NCR Corporation, Dayton, Ohio.

A limited access PIN according to the invention may preferably allow different, and preferably custom, functionality and/or limits, etc. from a conventional PIN. For example, whereas a conventional PIN provides access to the totality of a user's accounts with a bank or other financial institution, a limited access PIN according to the invention preferably provides some predetermined quantum of access less than full access.

The quantum may be expressed in terms of a limitation on the amount of funds available to a user, as determined by a user-defined and/or system-set parameter that corresponds to the PIN. The quantum may be expressed in terms of a time limitation on the PIN—i.e., the PIN may only provide access for a certain predetermined duration and expire thereafter. The quantum may be expressed in terms of a geographic limitation—i.e., the PIN may only provide access in a predetermined region. The quantum also may be expressed in terms of a time-based use limitation—i.e., the PIN may be valid for a predetermined time following the first use of the PIN—or some other suitably determined time factor.

It should be noted that systems and methods according to the invention may require various software and/or hardware PIN authentication enhancements. Such enhancements may preferably obtain different software responses which correspond to the entered PIN. Accordingly, when a predetermined PIN is entered following a card swipe, systems and methods according to the invention may send one or more different software and/or hardware responses. Such systems and methods may require that multiple offset values be stored on the bank card.

In alternative embodiments of the invention, the self-service device itself may include multiple PIN decoding algorithms in order to match a PIN with predetermined limited access information. Preferably, systems and methods according to the invention may be implemented such that communication with a central server does not include actual PIN information but rather some value that corresponds to the limited access associated with the limited access PIN.

Certain embodiments of the invention may involve a "panic" PIN. Such a PIN may send a message to a central server that a user senses danger and requires immediate assistance. Such a server may include software/hardware that is sensitive to the entry of such a PIN. Such software/hardware may be stored and/or co-located with other authorization software/hardware.

In other embodiments of the invention, a "security violation alert" PIN may also be used. Upon receipt and identification of such a security violation alert PIN, a self-service device may send a communication to appropriate authorities with an embedded message that identifies the present user as a fraud. In one exemplary circumstance, a rightful bank card owner is robbed and forced to disclose his or her PIN information. The rightful owner discloses his security violation alert PIN to the assailant. Then the robber swipes the card at a self-service device and enters the security violation alert PIN.

Thereafter, in one embodiment of the invention, the self-service device may provide limited bank account access to the robber—e.g., the robber may be allowed to withdraw a limited sum. Following receipt of the security violation alert PIN, the self-service device may be configured to substantially simultaneously send an alert message to the appropriate authorities. In some embodiments of the invention, the self-service may invoke a timing device that serves to slow down the actions of the self-service device in order to allow additional time for the travel and arrival of the appropriate authorities.

In certain embodiments of the invention, each member of a predetermined group—e.g., employees of a business and/or members of a family—may be issued an individual PIN. In such embodiments, systems and methods can track bank card activity, and the usage of accounts corresponding thereto, by person because each person is identifiable by his or her uniquely-issued PIN.

In some embodiments of the invention, online banking portals may include various levels of access. Such access may depend upon which PIN may be entered. Accordingly, certain members of a group may be allowed full access. Others may be allowed limited access. The level of access of a user may correspond to the user's preferably uniquely-issued PIN. In similar embodiments, the PIN may combined with a bank card such that, when a user attempts to use his or her bank card at an ATM, and enters his uniquely-issued PIN, a limited access banking portal may be provided to the user. In certain embodiments, a user may be notified of updates to certain PINs on a periodic basis. Such PINs may include various types of limited access PINs as described herein.

In certain embodiments of the invention that utilize a funds-limitation quantum, certain, preferably preselected, members of a group may be able to limit use of a bank card for certain other members of the group. For example, a parent may be able to give his or her bank card to a child and provide the child with a PIN that will limit the ability of the child to withdraw funds. Such a limitation may be funds-based—e.g., the child may be able to use the PIN to withdraw only some amount less than two hundred dollars.

In some embodiments of the invention, a PIN may be provided that is "disposable"—i.e. following a predetermined number of uses, the PIN ceases to validate access into the user's account(s). It should be noted that this embodiment, as well as any of the other embodiments of the invention described herein, may be combined with one or more of the other embodiments. For example, a disposable PIN may be combined with a funds-limited PIN such that a single PIN may provide only one-time access for a limited amount of funds—e.g., two hundred dollars.

Apparatus and methods that are used to determine and transmit the various parameters of limited PIN access may utilize Base24—a software application available from ACI Worldwide Corp., Omaha, Nebr. under the trademark BASE24—that runs on the server and that is typically used for ATM connectivity—or any other application that runs on a server that communicates with the ATMs.

Many self-service devices are networked with other self-service devices. A group of networked self-service devices may be served by one or more servers. Apparatus and methods according to the invention may preferably be applicable to numerous self-service devices across a communications network. Accordingly, if a PIN access is limited by a predetermined quantum stored at a central server or limited in some other fashion, then the PIN should preferably be limited at each of the self-service devices that utilize the information in the server.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 125.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 125 and/or storage to provide instructions to processor 103 for enabling server 101 to perform various functions. For example, memory 125 may store software used by server 101, such as an operating system 117, application programs 119, and an associated database 121. Alternatively, some or all of server 101 computer executable instructions may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information.

Any information described above in connection with database 121, and any other suitable information, may be stored in memory 125.

One or more of applications 119 may include one or more algorithms that may be used to receive and parse limited access PINs, panic PINs, security violation alert PINs and/or any other suitable tasks related to limited access self-service device PIN implementation.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
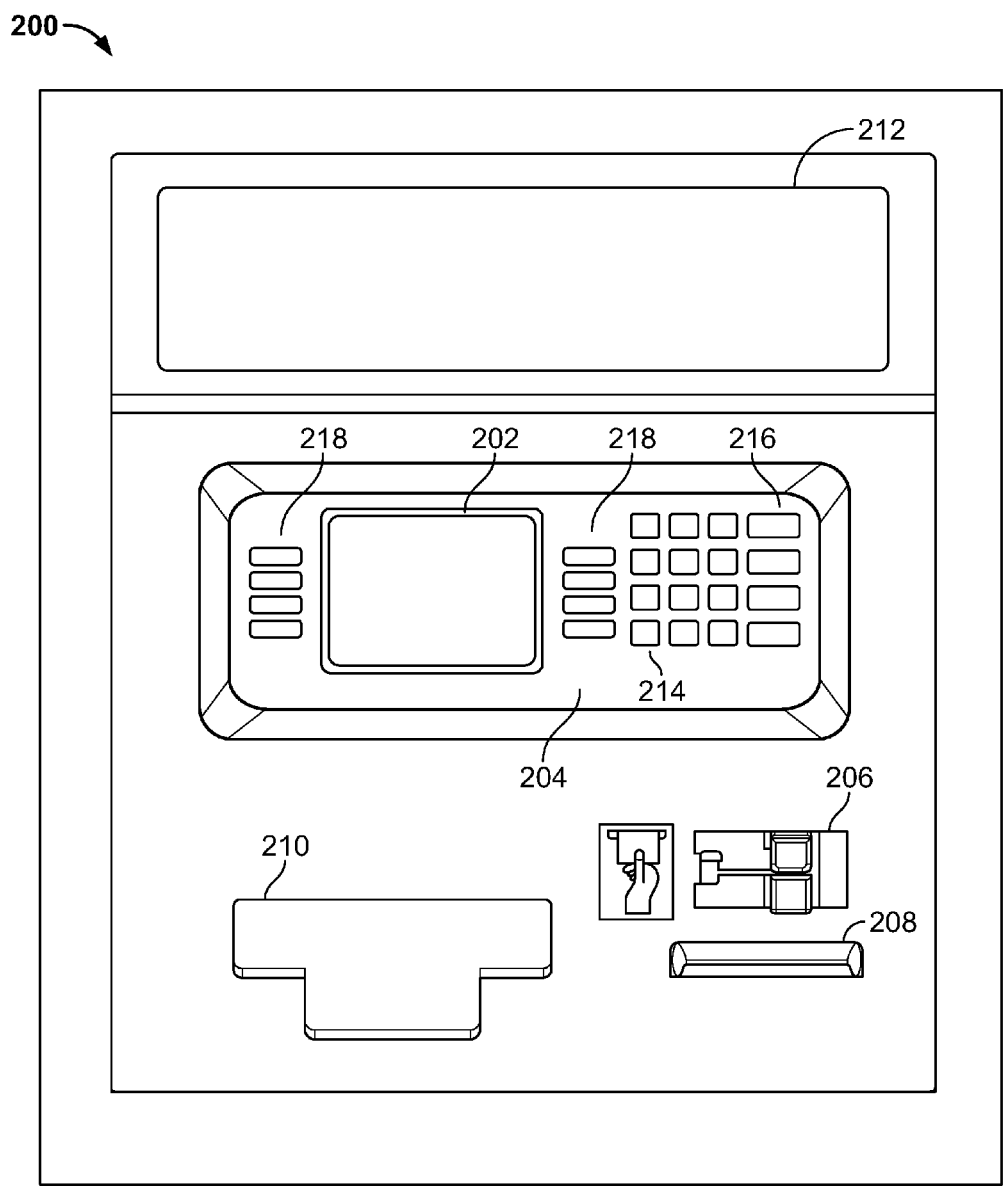
FIG. 2 shows an apparatus for use according to the principles of the invention.

FIG. 2 shows illustrative self-service device 200, which may be an ATM. Self-service device 200 may include monitor 202, keypad 204, card reader port 206, document acceptor 208, item dispenser 210 and security screen 212.

Monitor 202 may exchange visual and or audio information with a customer. Keypad 204 may include alphanumeric keys 214 for the customer to enter numerical and textual data. Keypad 204 may include control keys 216. In some embodiments, control keys 216 may be used to communicate control information, such as instructions, to self-service device 200. Keypad 204 may include soft keys. Soft keys 218 may have functions that are dictated by programming and are presented to the customer using information that may be displayed on monitor 202.

Card reader port 206 may be the front end of any suitable card reader. The card reader may read magnetically encoded information on transaction instruments such as bank cards. In some embodiments, self-service device 200 may include a contactless chip reader, a wireless transceiver or any other suitable interface for exchanging transaction information with a transaction instrument. The transaction instrument may be a chip, an RFID tag, a smart card, a PDA, a telephone or any other suitable device.

In some embodiments, self-service device 200 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina a hand or any other suitable anatomical feature. The biometric sensor may identify the customer based on a behavioral feature such as a signature, a voice, a gait or any other suitable behavioral feature.

In some embodiments of the invention, the biometric sensor may be used alone, or in combination with a PIN and/or bank card, as a limited access device. In such embodiments, the biometric sensor may act to identify a user such that limited access features according to the invention may be implemented. Further, such a device may be used in combination with some or all of the other embodiments described in this application.

Document acceptor 208 may accept any suitable documents. For example, document acceptor 208 may accept envelopes, deposit forms, bills, checks or any other suitable documents. In some embodiments, document acceptor 208 may feed into a scanner that digitizes the documents for image-based transaction processing.

It should be noted that a limited access PIN according to the invention may or may not limit the ability of a user to deposit documents in self-service device 200. In certain embodiments, a limited access PIN may limit certain types of document deposits but not others. In other embodiments, a limited access PIN may prevent any deposits and only allow withdrawals.

Item dispenser 210 may dispense items. For example, item dispenser 210 may dispense bills. In some embodiments of the invention, dispenser 210 may be limited to dispensing certain amounts of funds, and/or certain sizes of bills. Such limitations may be user-defined and/or system set. In other embodiments, the limited access pin may set local limits on dispensing funds, as described elsewhere in this specification.

Security screen 212 may visually screen a surveillance device (not shown). The surveillance device may provide video information about individuals that are present near the self-service device and the conditions there.

Figure 3:
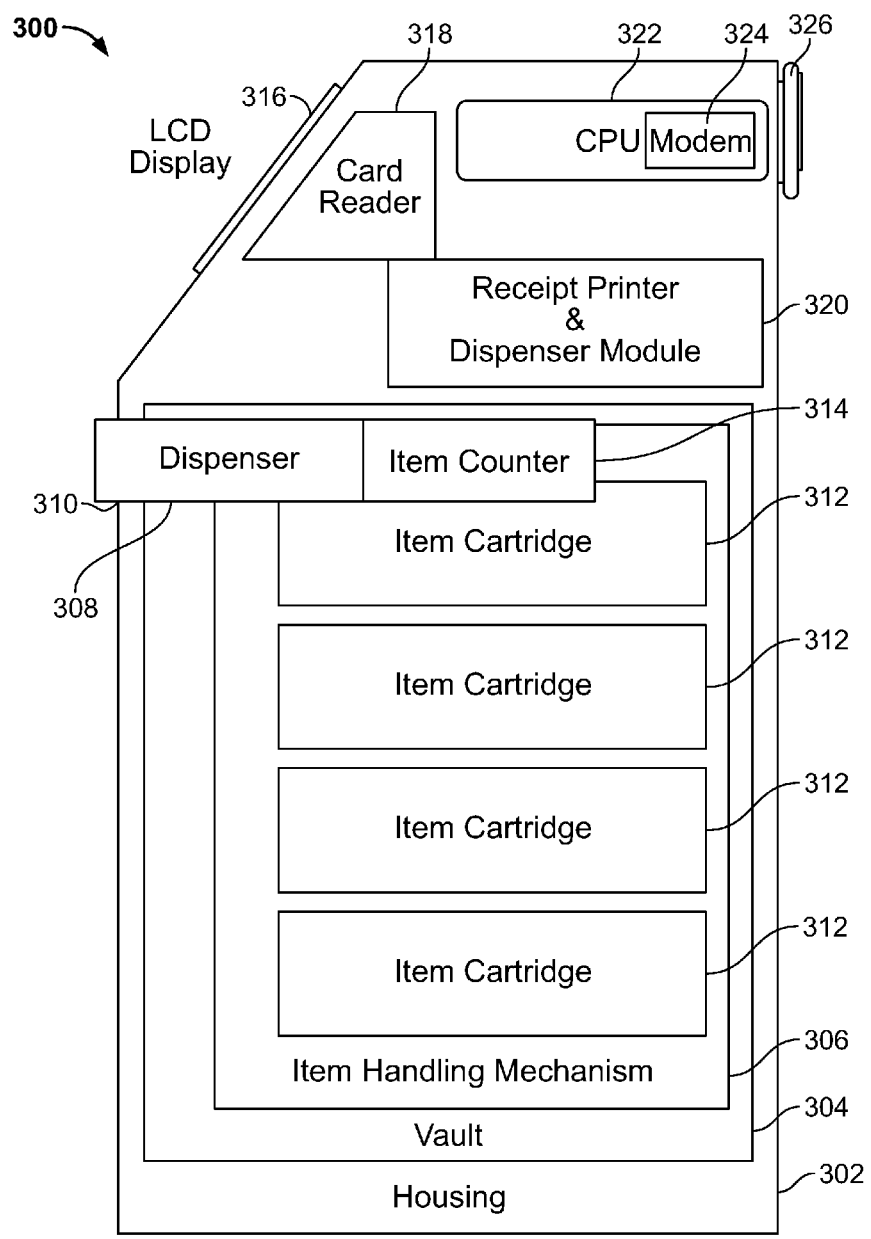
FIG. 3 shows a schematic diagram of another apparatus for use according to the principles of the invention.

FIG. 3 shows illustrative self-service device 300. Self-service device 300 may have one or more of the features of self-service device 200 (shown in FIG. 2). Self-service device 300 may include housing 302. Self-service device 300 may include vault 304. Vault 304 may contain items (not shown). Item handling mechanism 306 may be present in vault 304. Item handling mechanism 306 may store, arrange, dispense and/or otherwise handle items for dispensing from self-service device 200. For example, item handling mechanism 306 may include conveyors (not shown) for positioning and repositioning items for dispensing by dispenser 308 through item port 310. Items (not shown) in item handling mechanism 306 may be contained in item cartridges 312. For example, when the items are bills, item cartridges 312 may be cash cartridges.

Item handling mechanism 306 may include item counter 314. Item counter 314 may count items prior to dispensing by dispenser 308.

Self-service device 300 may include LCD display 316 and a keypad (not shown) for customer interaction. Card reader 318 may be present for receiving transaction information from the customer via a suitable transaction instrument. Self-service device 300 may include receipt printer and dispenser module 320. Receipt printer and dispenser module 320 may provide the customer with a record of a transaction. CPU 320 may control customer I/O, dispensing processes, which may include initialization, actuation, dispensing and any other suitable processes, receipt printing and dispensing, transaction channel communications and any other suitable processes. The transaction channel communications may be performed using modem 324, which may be any suitable communication device. Modem 324 may communicate with a local or regional network router (not shown). Service monitor 326 may be provided for a service technician to exchange information and instructions with CPU 322.

Figure 4:
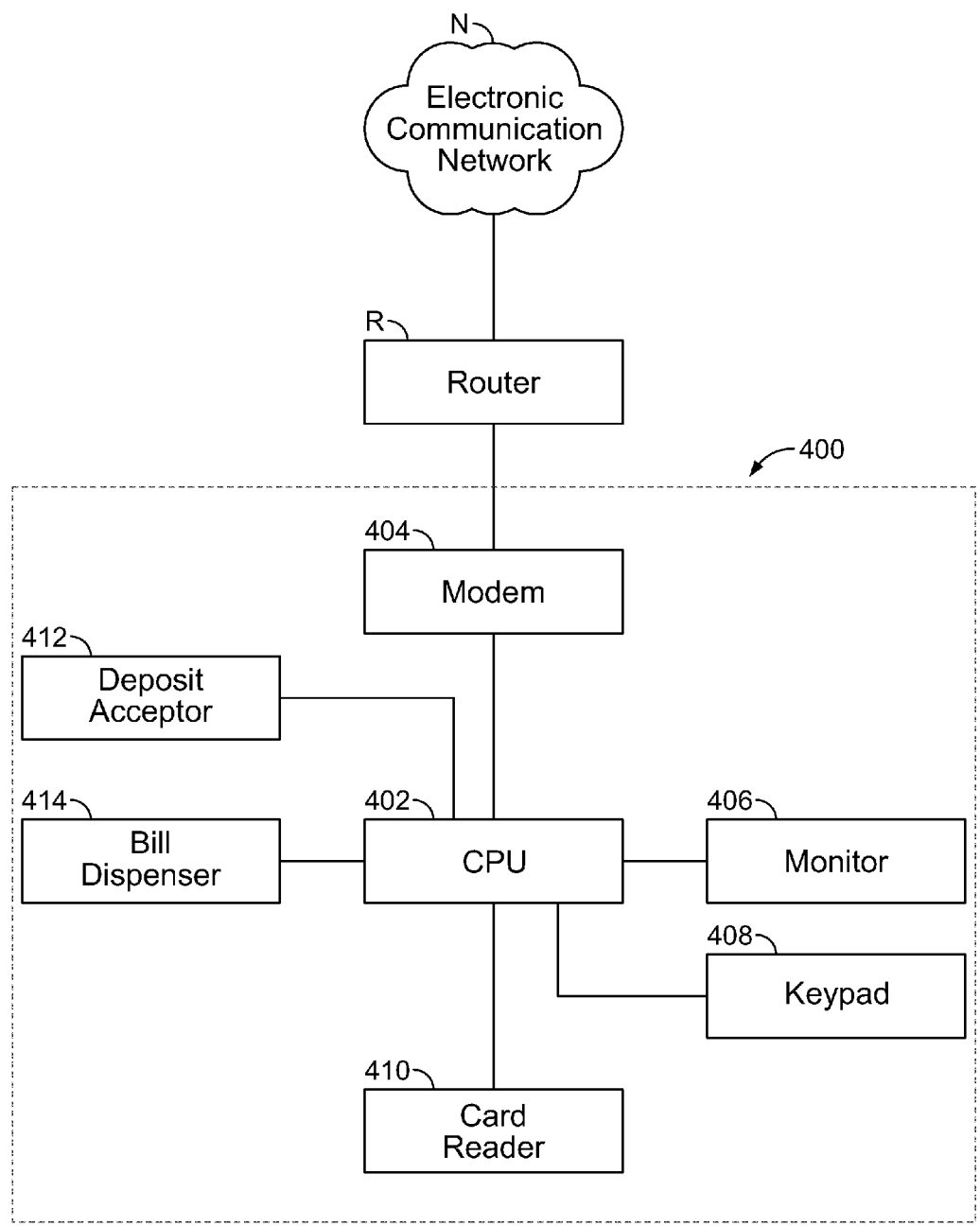
FIG. 4 shows a schematic diagram of apparatus for use according to the principles of the invention.

FIG. 4 shows control system 400 for controlling a self-service device such as 300 (shown in FIG. 3). System 400 is controlled by CPU 402. CPU 402 exchanges transaction information with electronic communication network N via modem 404, which is in communication with router R. CPU 402 may receive transaction information from a customer via monitor 406, keypad 408, card reader 410 and deposit acceptor 412. CPU 402 may dispense bills through bill dispenser 414.

In certain embodiments of the invention, CPU 402 may receive transaction information from keypad 408 and/or card reader 410 that corresponds to a limited access PIN according to the invention. In such circumstances, CPU 402 may preferably communicate such information to network N via modem 404, which is in communication with router R.

It should be noted that prior to communicating with the network via router R, CPU 402 typically verifies the PIN received from the user with a PIN offset value stored on the magnetic stripe, or other storage mechanism, on the bank card. The PIN offset value typically corresponds to the input user PIN but is "offset" by some predetermined value (or using a predetermined algorithm) in order to prevent fraudulent use of the bank card by a third party. Thus, if a third party were to obtain the bank card, the third party could not obtain the user PIN number without knowing a code that the self-service device used to match the PIN and the PIN offset value.

In systems and methods according to the invention, a bank card according to the invention may preferably store multiple offset values. Each of the offset values may preferably correspond to a predetermined limited access PIN. In addition, at least one of the offset values may correspond to a full access PIN.

When the self-service device matches an input PIN with one of the limited access PINs, the self-service device may preferably communicate, to a self-service device operations module, that the limited access PIN information had been received at the self-service device. In response to receipt of the limited access PIN information, the module may use the information to transmit limited access instructions to the self-service device. In such embodiments, it can be understood that the bank card may preferably store multiple offset values.

In other embodiments of the invention, a CPU, such as CPU 402 may be in communication with a memory (not shown) on the self-service device 400. Such a memory may store multiple codes for matching the PIN with an offset value on the bank card.

Figure 5:
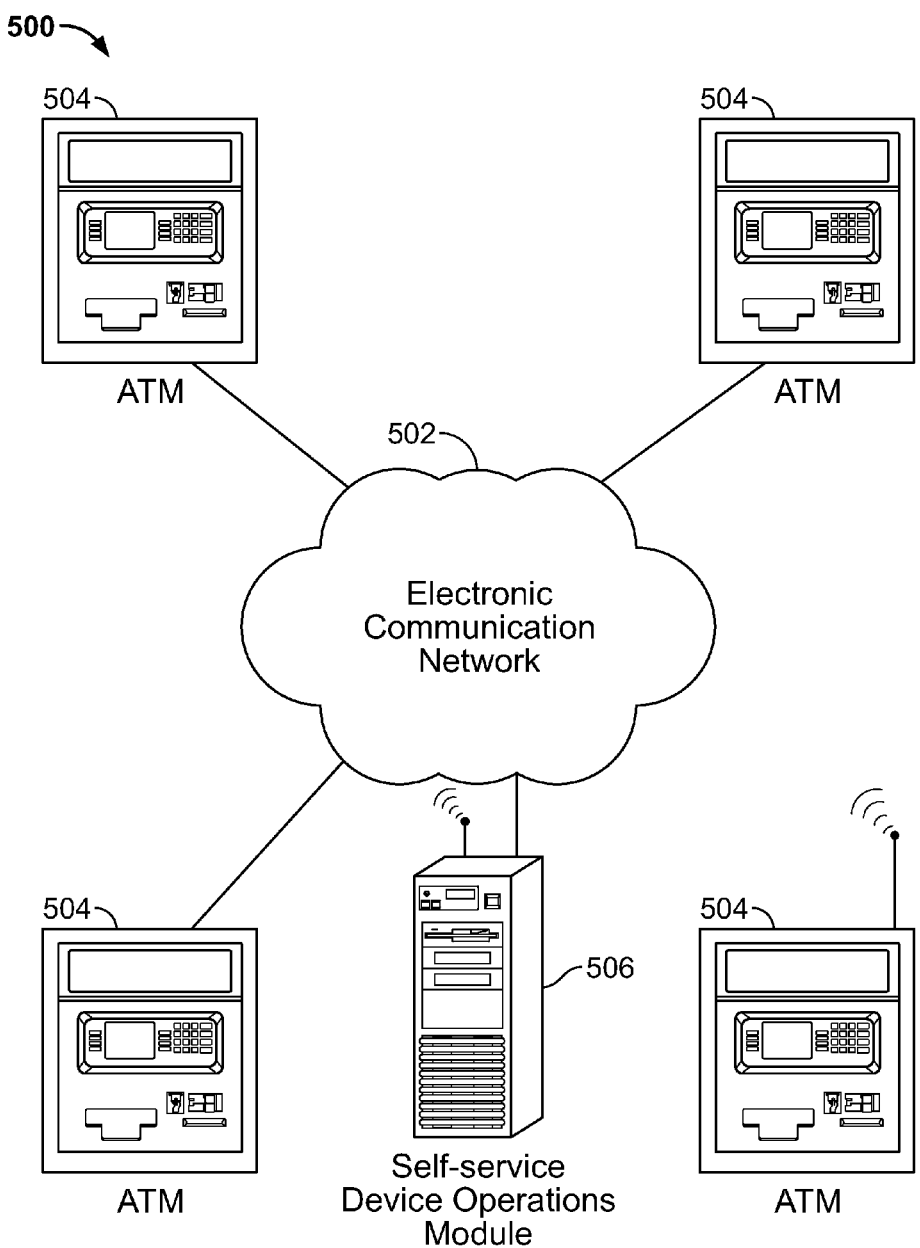
FIG. 5 shows a schematic diagram of a network for use according to the principles of the invention.

FIG. 5 shows illustrative transaction information network 500. Transaction information network 500 may include electronic communication network 502. Network 502 may be in part a LAN or WLAN, a WAN or WLAN or any other suitable network. Network 502 or portions thereof may be cabled, wired, optical fibered or wireless.

Self-service devices such as ATMs 504 may communicate via electronic communication network 502 with self-service device operations module 506. Self-service device operations module 506 may include one or more devices shown in FIG. 1. A remote user may use self-service device operations module 506 to monitor, control and/or intervene in one or more processes of ATMs 504. Such actions may correspond to one or more of the various limited access PIN implementations described herein.

Figure 6:
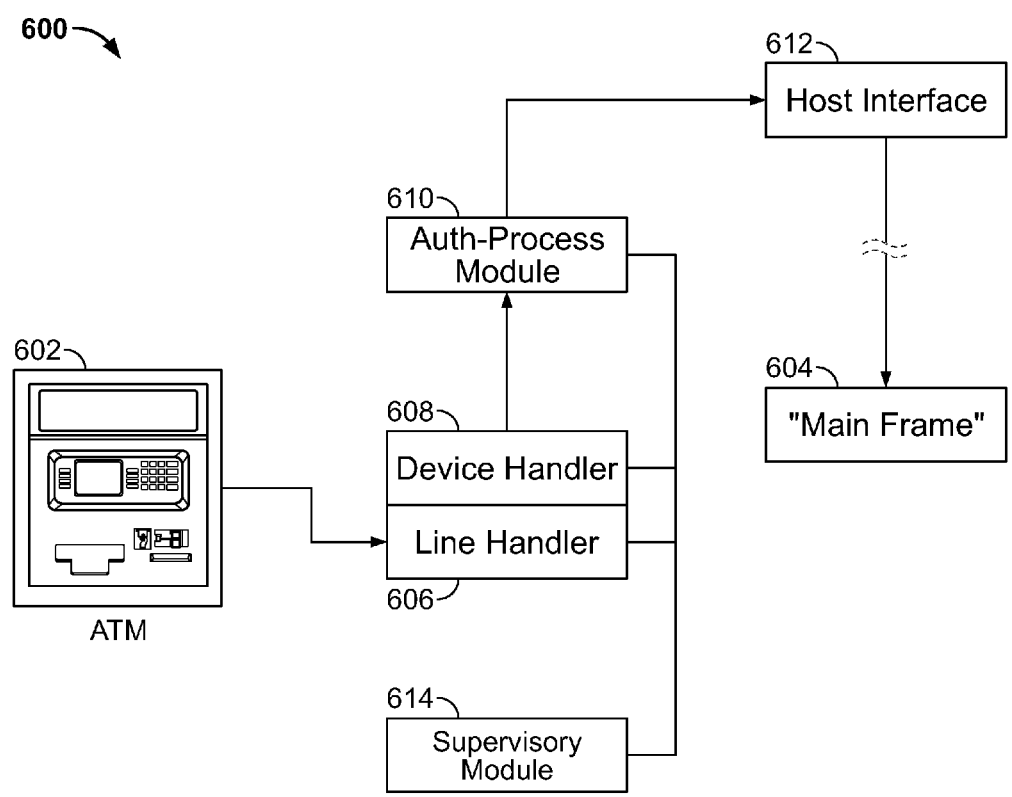
FIG. 6 shows a schematic diagram of another apparatus for use according to the principles of the invention.

FIG. 6 shows illustrative portions of communication system 600 for exchanging transaction information between ATM 602 and financial institution transactional platform 604. ATM 602 may be an ATM such as 300 (shown in FIG. 3). Transactional platform 604 may be any suitable device for settlement and clearing of transactions. For example, platform 604 may be a financial institution mainframe.

Command lines in transactional information from ATM 602 may be executed at line handler protocol layer 606. Device handler 608 may handle routing decisions based on transactional information requirements for authorization, settlement, clearance, transactional networks and issuing financial institutions.

In certain implementations according to the invention, such authorization may include limited access PIN authorization. Such limited PIN authorization may also be executed at line handler protocol layer 606.

Authorization requests may then be processed by auth-process module 610. Auth-process module 610 may then provide transactional information to host interface 612 for communication with platform 604. In limited access PIN embodiments according to the invention, such transaction information may be further processed by host interface 612 and communicated to main frame 604.

Supervisory module 614 may receive diagnostic data from line handler 606, device handler 608, auth-process module 610, or any other suitable source. The diagnostic data may be used to manage ATM 602. The diagnostic data may be provided to a self-service operations module such as 506 (shown in FIG. 5).

Figure 7:
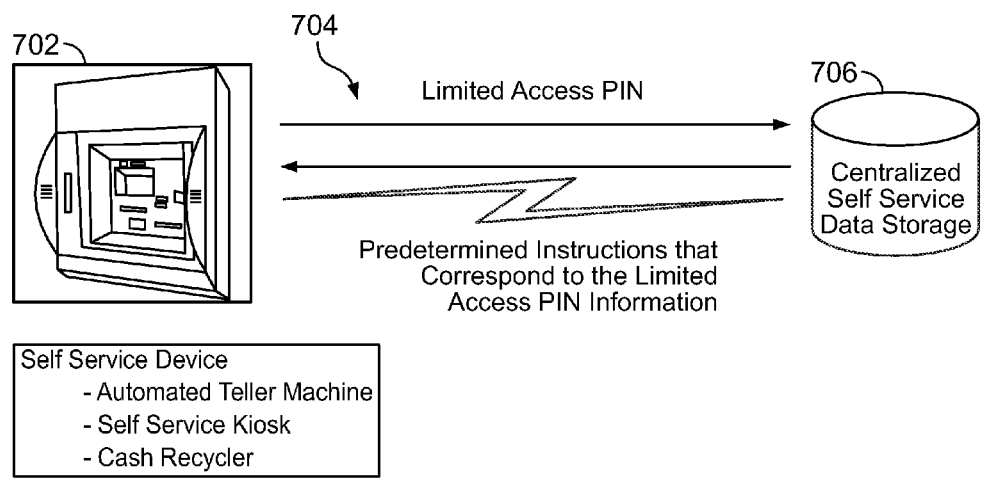
FIG. 7 shows elements of another illustrative hybrid device/process in accordance with the principles of the invention.
Figure 8:
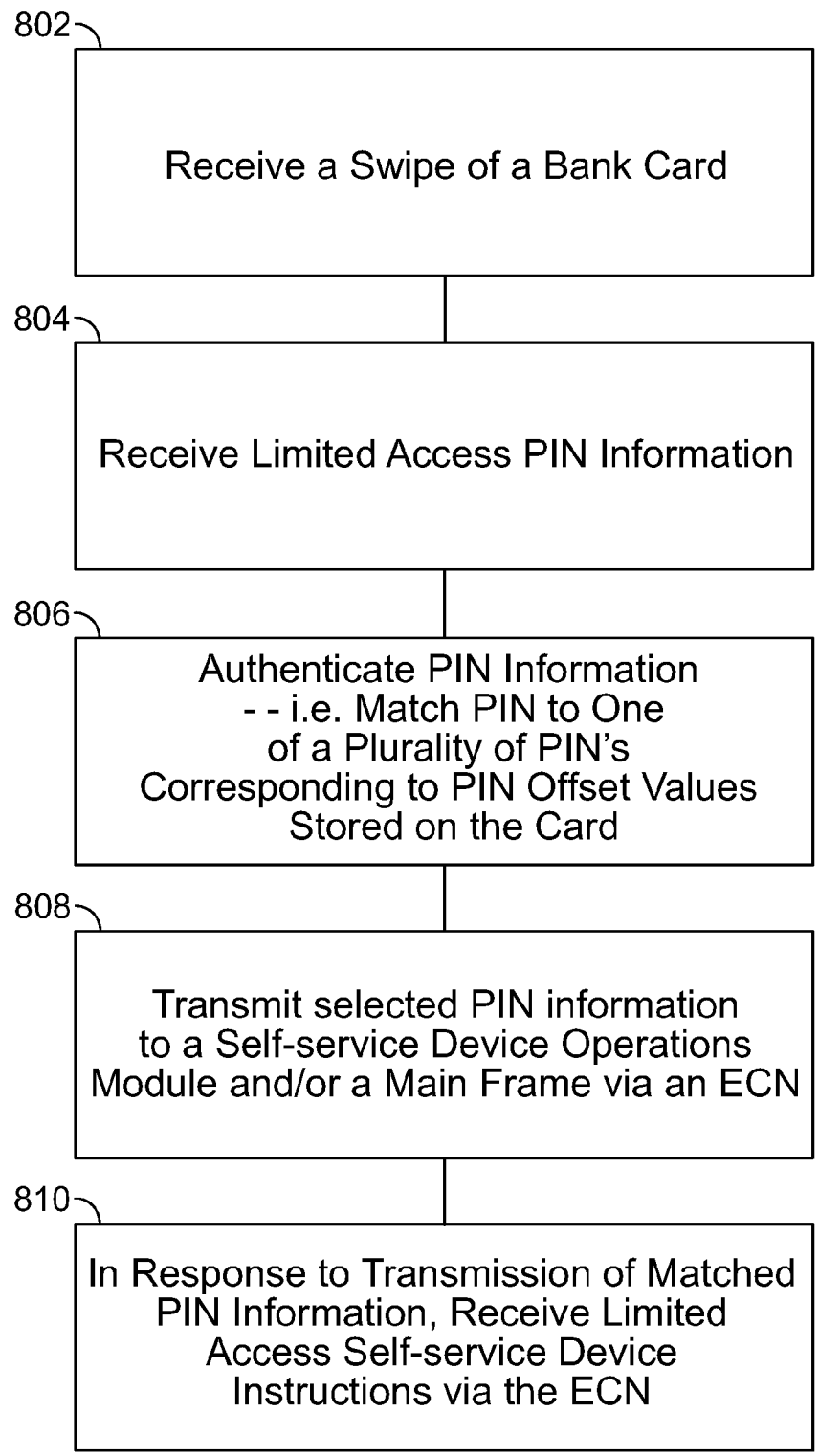
FIG. 8 shows an illustrative flow diagram that describes a method for implementing a limited access PIN according to the invention.
Figure 9:
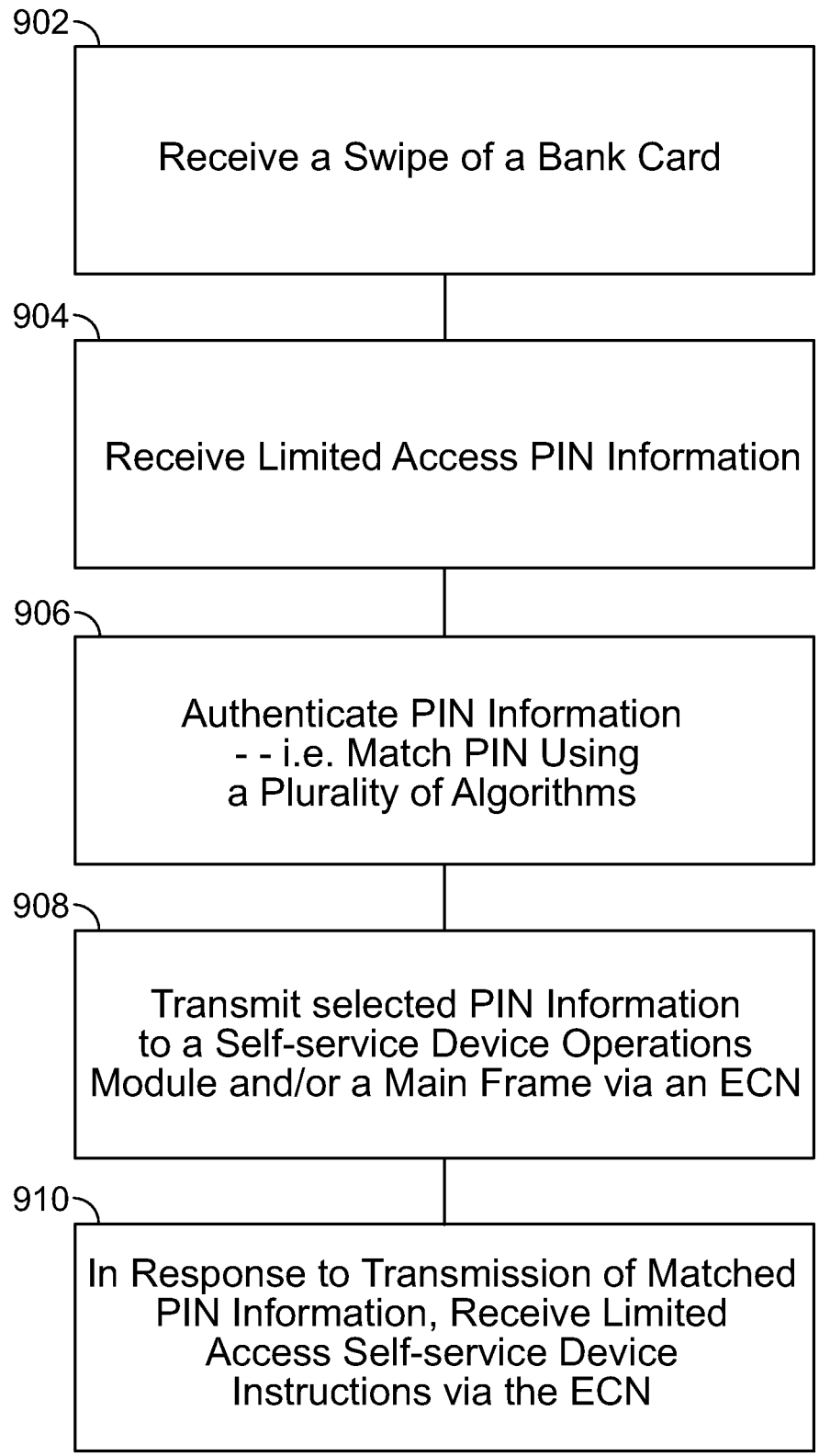
FIG. 9 shows another illustrative flow diagram that describes another method for implementing a limited access PIN according to the invention.

Processes in accordance with the principles of the invention may include one or more features of the process illustrated in FIGS. 7-9. For the sake of illustration, the steps of the process illustrated in FIG. 7-9 will be described as being performed by a "system." The "system" may include one or more of the features of the apparatus that are shown in FIGS. 1-6 and/or any other suitable device or approach. The "system" may be provided by an entity. The entity may be an individual, an organization or any other suitable entity.

FIG. 7 shows elements of an illustrative hybrid device/process in accordance with the principles of the invention. FIG. 7 shows a self-service device 702. Self-service device 702 may be an ATM, a self-service kiosk, a cash recycler or another suitable self-service device (referred to collectively herein as a "self-service device").

The network accessibility 704 of device 702 preferably requires a secure network connection and further requires user authentication. Such network accessibility 704 may provide a connection to remote central self service device data storage 706.

Such accessibility, together with ATM data transmission, may preferably be used to implement embodiments of limited access PIN information.

Limited access PIN information transferred to self-service device 706 may set forth guidelines for the current transaction. Such guidelines may control the accessibility and release of data from self-service device 702. Such unique guidelines and/or instructions may preferably correspond to limited access PIN information 706.

FIG. 8 shows an illustrative flow diagram of one embodiment of a method implemented on a self-service device according to the invention. Step 802 shows receiving a swipe of a bank card. Step 804 shows receiving limited access PIN information. Step 806 shows authenticating PIN information—i.e., matching PIN information to one of a plurality of limited access PINs stored on the card.

In certain embodiments of the invention, each of the limited access PINs may also include a limited access class identifier. Such an identifier may preferably include information relating to the quantum of limitation on the access of the card and/or parameters of limitation. Such an identifier may include information regarding the level of restriction of funds accessible using such card.

As described above, the limited access PIN may be identified by matching one of a plurality of offset values stored on the card, and then sending the information based on the matched PIN to an electronic communications network ("ECN").

In these or other methods, a limited access identifier may be transmitted to the appropriate location, whether a self-service device operations module, a main frame, or some other suitable location, via the ECN.

Step 808 shows transmitting selected PIN information to a self-service device operations module and/or main frame via an ECN (see FIGS. 5 and 6). As noted herein, the selected PIN information preferably does not include information regarding the actual PIN but rather the limited access characteristics relating to the PIN as well as PIN authorization information. Step 810 shows, in response to transmission of selected PIN information, receiving limited access self-service device instructions from the self-service device operations module and/or main frame via the ECN.

FIG. 9 shows an illustrative flow diagram of another method of implementing a limited access PIN according to the invention. Step 902 shows receiving a swipe of a bank card.

Step 904 shows receiving limited access PIN information. Step 906 shows authenticating the PIN information—i.e., matching PIN information to one of a plurality of algorithms to determine whether the PIN is a limited access PINs. Such a method may be implemented by testing various algorithmic decoding mechanisms. In such an embodiment, the PIN may be associated with a particular limited-access quantum via the identification of the algorithmic decoding mechanism that converted the PIN information to a predetermined PIN offset value.

Once the algorithmic decoding mechanism is obtained, the algorithmic decoding mechanism information, which is referred to as "selected PIN information" in step 908, may be transmitted to a self-service device operations module or main frame via an ECN, as shown in step 908, in order to identify the limited access characteristics associated with the PIN.

Finally, in response to transmission of algorithmic decoding mechanism information, the self-service device may receive access information from the ECN and/or the main frame, as shown in step 908. Preferably, in the scenarios implemented by the invention, PIN information is typically not transmitted outside of the self service device.

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, a self-service terminal with mechanism(s) for making deposits and for permitting withdrawals as well as methods for operating said terminal in response to receipt of a limited access PIN have been provided. Persons skilled in the art will appreciate that the present invention can be practiced by other than the described embodiments, which are presented for purposes of illustration rather than of limitation. The present invention is limited only by the claims that follow.

What is claimed is:

1. An automated teller machine ("ATM") comprising:
   a receiver configured to receive multiple inputs, each of the multiple inputs including a different personal identification number ("PIN") and one of the PINs comprising a received PIN, wherein each of the different PINs is associated with a same financial institution account and at least one PIN authorizes full access to the account;
   a local processor configured to determine whether predetermined limited access information corresponds to the received PIN;
   a communication device;
   wherein, when the limited access information corresponds to the received PIN:
   the communication device is configured to transmit the limited access information to a remote central server, said limited access information not including the received PIN;
   the receiver is configured to receive limited access instructions from the remote central server, said limited access instructions providing access to a predetermined portion of the financial institution account, said predetermined portion being less than the entirety of the financial institution account; and in response to the received limited access instructions, said limited access instructions received from the remote central server in response to transmission of the limited access information by the communication device to the remote central server, said limited access information corresponding to the received PIN, the local processor is further configured to provide access to the predetermined portion of the financial institution account;

a document acceptor, wherein, in response to the received limited access instructions, said limited access instructions received from the remote central server in response to transmission of the limited access information by the communication device to the remote central server, said limited access information corresponding to the received PIN, the local processor is further configured to prohibit access to the document acceptor; and a display screen;

wherein, in response to the received limited access instructions, said limited access instructions received from the remote central server in response to transmission of the limited access information by the communication device to the remote central server, said limited access information corresponding to the received PIN, wherein the receiver is configured to receive multiple inputs, each of the multiple inputs including a different PIN and one of the PINs comprising the received PIN, wherein each of the different PINs is associated with the same financial institution account and at least one PIN authorizes full access to the account, the local processor is further configured to present a limited access internet banking portal on the display screen, wherein an internet banking portal comprises a set of selectable options for accessing available banking services and the limited access internet banking portal comprises a limited set of selectable options that is fewer than the set of selectable options; and wherein, the receiver is further configured to periodically receive information including at least one updated PIN.

2. The ATM of claim 1 wherein the access to the predetermined portion of the financial institution account is limited to a predetermined quantum of uses.

3. The ATM of claim 1 wherein the communication device is further configured to transmit information in communication with a router, said information including the limited access information.

4. The ATM of claim 1 wherein:

a predetermined security alert is activated in response to the received PIN; and, the communication device is further configured to transmit a communication comprising a fraud notification in response to the security alert.

5. The ATM of claim 4 wherein:

the ATM includes a timing device; and the timing device is configured to slow the actions of the ATM in response to the received PIN.

6. The ATM of claim 1 wherein:

a predetermined panic alert is activated in response to the received PIN; and the communication device is further configured to transmit a message to the remote central server that a customer is in danger and requires immediate assistance in response to the panic alert.

7. The ATM of claim 1 wherein the limited access instructions received from the remote central server prevent a deposit of funds into the account via the document acceptor.

8. An automated teller machine ("ATM") comprising:

a receiver configured to receive multiple inputs, each of the multiple inputs including a different personal identification number ("PIN") and one of the PINs comprising a received PIN, wherein each of the different PINs is associated with a same financial institution account and at least one PIN authorizes full access to the account;

a local processor configured to determine whether predetermined limited access information corresponds to the received PIN; and a communication device;

wherein, when the limited access information corresponds to the received PIN:

the communication device is configured to communicate the limited access information to a remote central server, said limited access information not including the received PIN;

the receiver is configured to receive limited access instructions from the remote central server, said limited access instructions providing access to a predetermined portion of the financial institution account, said access to the predetermined portion of the financial institution account being limited to a predetermined quantum of time and said predetermined portion of the financial institution account being less than the entirety of the financial institution account; and in response to the received limited access instructions, said limited access instructions received from the remote central server in response to transmission of the limited access information by the communication device to the remote central server, said limited access information corresponding to the received PIN, the local processor is further configured to provide access to the predetermined portion of the financial institution account within the predetermined quantum of time;

a document acceptor;

wherein, in response to the received limited access instructions, said limited access instructions received from the remote central server in response to transmission of the limited access information by the communication device to the remote central server, said limited access information corresponding to the received PIN, the local processor is further configured to prohibit access to the document acceptor; and a display screen;

wherein, in response to the received limited access instructions, said limited access instructions received from the remote central server in response to transmission of the limited access information by the communication device to the remote central server, said limited access information corresponding to the received PIN, wherein the receiver is configured to receive multiple inputs, each of the multiple inputs including a different PIN and one of the PINs comprising the received PIN, wherein each of the different PINs is associated with the same financial institution account and at least one PIN authorizes full access to the account, the local processor is further configured to present a limited access internet baking portal on the display screen, wherein an internet banking portal comprises a set of selectable options for accessing available banking services and the limited access banking portal comprises a limited set of selectable options that is fewer than the set of selectable options; and wherein the receiver is further configured to periodically receive information including at least one updated PIN.

9. The ATM of claim 8 wherein, when the ATM communicates electronically via a router, the information includes limited access PIN information.

10. An automated teller machine ("ATM") comprising:
a receiver configured to receive multiple inputs, each of the multiple inputs including information comprising a different personal identification number ("PIN") and one of the PINs comprising a received PIN, wherein each of the different PINs is associated with a same financial institution account and at least one PIN authorizes full access to the account;
a local processor configured to determine whether predetermined limited access information corresponds to the received PIN; and
a communication device;
wherein, when the limited access information corresponds to the received PIN:
the communication device is configured to communicate the limited access information to a remote central server, said limited access information not including the received PIN;
the receiver is configured to receive limited access instructions from the remote central server, said limited access instructions providing access to a predetermined portion of the financial institution account, said access to the predetermined portion of the financial institution account being limited to a predetermined quantum of funds and said predetermined portion of the financial institution account being less than the entirety of the financial institution account; and
in response to the received limited access instructions said limited access instructions received from the remote central server in response to transmission of the limited access information by the communication device to the remote central server, said limited access information corresponding to the received PIN, the processor is further configured to provide access to the predetermined portion of the financial institution account;
a document acceptor;
wherein, in response to the received limited access instructions, said limited access instructions received from the remote central server in response to transmission of the limited access information by the communication device to the remote central server, said limited access information corresponding to the received PIN, the local processor is further configured to prohibit access to the document acceptor; and
a display screen;
wherein, in response to the received limited access instructions, said limited access instructions received from the remote central server in response to transmission of the limited access information by the communication device to the remote central server, said limited access information corresponding to the received PIN, wherein the receiver is configured to receive multiple inputs, each of the multiple inputs including a different PIN and one of the PINs comprising the received PIN, wherein each of the different PINs is associated with the same financial institution account and at least one PIN authorizes full access to the account, the local processor is further configured to present a limited access internet banking portal on the display screen, wherein an internet banking portal comprises a set of selectable options for accessing available banking services and the limited access banking portal comprises a limited set of selectable options that is fewer than the set of selectable options; and
wherein the receiver is further configured to periodically receive information including at least one updated PIN.

11. The ATM of claim 10 wherein, when the ATM communicates electronically via a router, the information includes limited access PIN information.

* * * * *